United States Patent
Noureddine et al.

(10) Patent No.: US 11,809,321 B2
(45) Date of Patent: *Nov. 7, 2023

(54) MEMORY MANAGEMENT IN A MULTIPLE PROCESSOR SYSTEM

(71) Applicant: Microsoft Technology Licensing, LLC, Redmond, WA (US)

(72) Inventors: Wael Noureddine, Santa Clara, CA (US); Jean-Marc Frailong, Rancho Mirage, CA (US); Pradeep Sindhu, Los Altos Hills, CA (US); Bertrand Serlet, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,419

(22) Filed: Jun. 10, 2022

(65) Prior Publication Data

US 2022/0300423 A1 Sep. 22, 2022

Related U.S. Application Data

(63) Continuation of application No. 16/791,957, filed on Feb. 14, 2020, now Pat. No. 11,360,895, which is a (Continued)

(51) Int. Cl.
*G06F 12/0815* (2016.01)
*G06F 12/0804* (2016.01)
*G06F 15/173* (2006.01)

(52) U.S. Cl.
CPC ...... *G06F 12/0815* (2013.01); *G06F 12/0804* (2013.01); *G06F 15/17325* (2013.01);
(Continued)

(58) Field of Classification Search
CPC ............ G06F 12/0815; G06F 12/0804; G06F 15/17325; G06F 2212/1016; G06F 2212/1032
See application file for complete search history.

(56) References Cited

U.S. PATENT DOCUMENTS 4,872,157 A 10/1989 Hemmady et al.
4,872,159 A 10/1989 Hemmady et al.
(Continued)

FOREIGN PATENT DOCUMENTS

CN 101447986 A 6/2009
CN 103004158 A 3/2013
(Continued)

OTHER PUBLICATIONS

"First Office Action and Search Report Issued in Chinese Patent Application No. 201880038296.2", dated Apr. 20, 2023, 10 Pages.
(Continued)

*Primary Examiner* — Zhuo H Li
(74) *Attorney, Agent, or Firm* — Alleman Hall Creasman & Tuttle LLP (57) ABSTRACT

Methods and apparatus for memory management are described. In one example, this disclosure describes a method that includes executing, by a first processing unit, first work unit operations specified by a first work unit message, wherein execution of the first work unit operations includes accessing data from shared memory included within the computing system, modifying the data, and storing the modified data in a first cache associated with the first processing unit; identifying, by the computing system, a second work unit message that specifies second work unit operations that access the shared memory; updating, by the computing system, the shared memory by storing the modified data in the shared memory; receiving, by the computing system, an indication that updating the shared memory with
(Continued)

the modified data is complete; and enabling the second processing unit to execute the second work unit operations.

20 Claims, 5 Drawing Sheets

Related U.S. Application Data continuation of application No. 15/949,892, filed on Apr. 10, 2018, now Pat. No. 10,565,112.

(60) Provisional application No. 62/483,844, filed on Apr. 10, 2017, provisional application No. 62/625,518, filed on Feb. 2, 2018.

(52) U.S. Cl.
CPC ............... *G06F 2212/1016* (2013.01); *G06F 2212/1032* (2013.01)

(56) References Cited

U.S. PATENT DOCUMENTS

| | | | |
|---|---|---|---|
| 5,301,324 A | 4/1994 | Dewey et al. |
| 5,812,549 A | 9/1998 | Sethu |
| 5,828,860 A | 10/1998 | Miyaoku et al. |
| 6,021,473 A | 2/2000 | Davis et al. |
| 6,055,579 A | 4/2000 | Goyal et al. |
| 6,314,491 B1 | 11/2001 | Freerksen et al. |
| 6,553,030 B2 | 4/2003 | Ku et al. |
| 6,842,906 B1 | 1/2005 | Bowman-Amuah |
| 6,901,451 B1 | 5/2005 | Miyoshi |
| 6,901,500 B1 | 5/2005 | Hussain |
| 6,990,063 B1 | 1/2006 | Lenoski et al. |
| 6,993,630 B1 | 1/2006 | Williams et al. |
| 7,035,914 B1 | 4/2006 | Payne et al. |
| 7,058,009 B1 | 6/2006 | Skirmont et al. |
| 7,082,477 B1 | 7/2006 | Sadhasivam et al. |
| 7,102,999 B1 | 9/2006 | Sindhu et al. |
| 7,275,103 B1 | 9/2007 | Thrasher et al. |
| 7,289,436 B2 | 10/2007 | Schaller et al. |
| 7,289,513 B1 | 10/2007 | Medved et al. |
| 7,289,964 B1 | 10/2007 | Bowman-Amuah |
| 7,342,887 B1 | 3/2008 | Sindhu |
| 7,480,304 B2 | 1/2009 | Yeh et al. |
| 7,486,678 B1 | 2/2009 | Devanagondi et al. |
| 7,623,524 B2 | 11/2009 | Muthukrishnan et al. |
| 7,633,861 B2 | 12/2009 | Willhite et al. |
| 7,664,110 B1 | 2/2010 | Lovett et al. |
| 7,733,781 B2 | 6/2010 | Petersen |
| 7,738,452 B1 | 6/2010 | O'Rourke et al. |
| 7,822,731 B1 | 10/2010 | Yu et al. |
| 7,843,907 B1 | 11/2010 | Abou-Emara et al. |
| 7,965,624 B2 | 6/2011 | Ripa et al. |
| 8,560,757 B2 | 10/2013 | Pangborn et al. |
| 8,582,440 B2 | 11/2013 | Ofelt et al. |
| 8,599,863 B2 | 12/2013 | Davis |
| 8,625,427 B1 | 1/2014 | Terry et al. |
| 8,689,049 B2 | 4/2014 | Ziegler et al. |
| 8,737,410 B2 | 5/2014 | Davis et al. |
| 8,798,077 B2 | 8/2014 | Mehra et al. |
| 8,848,728 B1 | 9/2014 | Revah et al. |
| 8,850,101 B2 | 9/2014 | Pangborn et al. |
| 8,850,125 B2 | 9/2014 | Pangborn et al. |
| 8,918,631 B1 | 12/2014 | Kumar et al. |
| 8,966,152 B2 | 2/2015 | Bouchard et al. |
| 9,065,860 B2 | 6/2015 | Pangborn et al. |
| 9,118,984 B2 | 8/2015 | DeCusatis et al. |
| 9,154,376 B2 | 10/2015 | Aziz |
| 9,225,628 B2 | 12/2015 | Zahavi |
| 9,262,225 B2 | 2/2016 | Davis et al. |
| 9,282,384 B1 | 3/2016 | Graves |
| 9,294,304 B2 | 3/2016 | Sindhu |
| 9,294,398 B2 | 5/2016 | DeCusatis et al. |
| 9,369,408 B1 | 6/2016 | Raghavan et al. |
| 9,405,550 B2 | 8/2016 | Biran et al. |
| 9,565,114 B1 | 2/2017 | Kabbani et al. |
| 9,569,366 B2 | 2/2017 | Pangborn et al. |
| 9,632,936 B1 | 4/2017 | Zuckerman et al. |
| 9,800,495 B2 | 10/2017 | Lu |
| 9,853,901 B2 | 12/2017 | Kampmann et al. |
| 9,866,427 B2 | 1/2018 | Yadav et al. |
| 9,876,735 B2 | 1/2018 | Davis et al. |
| 9,946,671 B1 | 4/2018 | Tawri et al. |
| 10,003,552 B2 | 6/2018 | Kumar et al. |
| 10,135,731 B2 | 11/2018 | Davis et al. |
| 10,140,245 B2 | 11/2018 | Davis et al. |
| 10,304,154 B2 | 5/2019 | Appu et al. |
| 10,387,179 B1 | 8/2019 | Hildebrant et al. |
| 10,425,707 B2 | 9/2019 | Sindhu et al. |
| 10,540,288 B2 | 1/2020 | Noureddine et al. |
| 10,565,112 B2 * | 2/2020 | Noureddine ........ G06F 12/0815 |
| 10,637,685 B2 | 4/2020 | Goel et al. |
| 10,645,187 B2 | 5/2020 | Goyal et al. |
| 10,659,254 B2 | 5/2020 | Sindhu et al. |
| 10,686,729 B2 | 6/2020 | Sindhu et al. |
| 10,725,825 B2 | 7/2020 | Sindhu et al. |
| 10,761,931 B2 | 9/2020 | Goyal et al. |
| 10,827,191 B2 | 11/2020 | Dikshit et al. |
| 10,841,245 B2 | 11/2020 | Gray et al. |
| 10,904,367 B2 | 1/2021 | Goel et al. |
| 10,929,175 B2 | 2/2021 | Goyal et al. |
| 10,951,393 B2 | 3/2021 | Thomas et al. |
| 10,965,586 B2 | 3/2021 | Goel et al. |
| 11,048,634 B2 | 6/2021 | Noureddine et al. |
| 11,178,262 B2 | 11/2021 | Goel et al. |
| 11,360,895 B2 * | 6/2022 | Noureddine ........ G06F 12/0804 |
| 2002/0015387 A1 | 2/2002 | Houh |
| 2002/0049859 A1 | 4/2002 | Bruckert et al. |
| 2002/0075862 A1 | 6/2002 | Mayes |
| 2002/0078227 A1 | 6/2002 | Kronenberg |
| 2002/0094151 A1 | 7/2002 | Li |
| 2002/0118415 A1 | 8/2002 | Dasylva et al. |
| 2002/0126634 A1 | 9/2002 | Mansharamani et al. |
| 2002/0126671 A1 | 9/2002 | Ellis et al. |
| 2003/0043798 A1 | 3/2003 | Pugel |
| 2003/0091271 A1 | 5/2003 | Dragone |
| 2003/0229839 A1 | 12/2003 | Wang et al. |
| 2004/0210320 A1 | 10/2004 | Pandya |
| 2004/0236912 A1 | 11/2004 | Glasco |
| 2005/0073963 A1 | 4/2005 | Goodfellow et al. |
| 2005/0154865 A1 | 7/2005 | Steely et al. |
| 2005/0166086 A1 | 7/2005 | Watanabe |
| 2005/0259632 A1 | 11/2005 | Malpani et al. |
| 2006/0029323 A1 | 2/2006 | Nikonov et al. |
| 2006/0056406 A1 | 3/2006 | Bouchard et al. |
| 2006/0092976 A1 | 5/2006 | Lakshman et al. |
| 2006/0112226 A1 | 5/2006 | Hady et al. |
| 2006/0277421 A1 | 12/2006 | Balestriere |
| 2007/0073966 A1 | 3/2007 | Corbin |
| 2007/0172235 A1 | 7/2007 | Snider et al. |
| 2007/0192545 A1 | 8/2007 | Gara et al. |
| 2007/0198656 A1 | 8/2007 | Mazzaferri et al. |
| 2007/0255906 A1 | 11/2007 | Handgen et al. |
| 2008/0002702 A1 | 1/2008 | Bajic |
| 2008/0138067 A1 | 6/2008 | Beshai |
| 2008/0244231 A1 | 10/2008 | Kunze et al. |
| 2008/0253294 A1 | 10/2008 | Ripa et al. |
| 2009/0024836 A1 | 1/2009 | Shen et al. |
| 2009/0083263 A1 | 3/2009 | Felch et al. |
| 2009/0135739 A1 | 5/2009 | Hoover et al. |
| 2009/0135832 A1 | 5/2009 | Fan et al. |
| 2009/0228890 A1 | 9/2009 | Vaitovirta et al. |
| 2009/0234987 A1 | 9/2009 | Lee et al. |
| 2009/0285228 A1 | 11/2009 | Bagepalli et al. |
| 2009/0303880 A1 | 12/2009 | Maltz et al. |
| 2009/0310610 A1 | 12/2009 | Sandstrom |
| 2010/0061391 A1 | 3/2010 | Sindhu et al. |
| 2010/0125903 A1 | 5/2010 | Devarajan et al. |
| 2010/0318725 A1 | 12/2010 | Kwon |
| 2011/0055827 A1 | 3/2011 | Lin et al. |
| 2011/0113184 A1 | 5/2011 | Chu |
| 2011/0170553 A1 | 7/2011 | Beecroft et al. |
| 2011/0173392 A1 | 7/2011 | Gara et al. |

(56) References Cited

U.S. PATENT DOCUMENTS

| | | |
|---|---|---|
| 2011/0202658 A1 | 8/2011 | Okuno et al. |
| 2011/0225594 A1 | 9/2011 | Iyengar et al. |
| 2011/0228783 A1 | 9/2011 | Flynn et al. |
| 2011/0238923 A1 | 9/2011 | Hooker et al. |
| 2011/0289179 A1 | 11/2011 | Pekcan et al. |
| 2011/0289180 A1 | 11/2011 | Sonnier et al. |
| 2011/0289279 A1 | 11/2011 | Sonnier et al. |
| 2012/0030431 A1 | 2/2012 | Anderson et al. |
| 2012/0036178 A1 | 2/2012 | Gavini et al. |
| 2012/0076153 A1 | 3/2012 | Manzella et al. |
| 2012/0096211 A1 | 4/2012 | Davis et al. |
| 2012/0176890 A1 | 7/2012 | Balus et al. |
| 2012/0177047 A1 | 7/2012 | Roitshtein |
| 2012/0207165 A1 | 8/2012 | Davis |
| 2012/0254587 A1 | 10/2012 | Biran et al. |
| 2012/0314710 A1 | 12/2012 | Shikano |
| 2013/0003725 A1 | 1/2013 | Hendel et al. |
| 2013/0024875 A1 | 1/2013 | Wang et al. |
| 2013/0028083 A1 | 1/2013 | Yoshida et al. |
| 2013/0088971 A1 | 4/2013 | Anantharam et al. |
| 2013/0145375 A1 | 6/2013 | Kang |
| 2013/0191443 A1 | 7/2013 | Gan et al. |
| 2013/0258912 A1 | 10/2013 | Zimmerman et al. |
| 2013/0330076 A1 | 12/2013 | Liboiron-Ladouceur et al. |
| 2013/0346789 A1 | 12/2013 | Brunel et al. |
| 2014/0023080 A1 | 1/2014 | Zhang et al. |
| 2014/0040909 A1 | 2/2014 | Winser et al. |
| 2014/0044128 A1 | 2/2014 | Suresh et al. |
| 2014/0059537 A1 | 2/2014 | Kamble et al. |
| 2014/0075085 A1 | 3/2014 | Schroder et al. |
| 2014/0161450 A1 | 6/2014 | Graves et al. |
| 2014/0187317 A1 | 7/2014 | Kohler et al. |
| 2014/0258479 A1 | 9/2014 | Tenginakai et al. |
| 2014/0269351 A1 | 9/2014 | Graves et al. |
| 2014/0310467 A1 | 10/2014 | Shalf et al. |
| 2014/0359044 A1 | 12/2014 | Davis et al. |
| 2015/0019702 A1 | 1/2015 | Kancheria |
| 2015/0037032 A1 | 2/2015 | Xu et al. |
| 2015/0043330 A1 | 2/2015 | Hu et al. |
| 2015/0117860 A1 | 4/2015 | Braun |
| 2015/0143045 A1 | 5/2015 | Han et al. |
| 2015/0143073 A1 | 5/2015 | Winser et al. |
| 2015/0163171 A1 | 6/2015 | Sindhu et al. |
| 2015/0178239 A1 | 6/2015 | Guthrie et al. |
| 2015/0180603 A1 | 6/2015 | Darling et al. |
| 2015/0186313 A1 | 7/2015 | Sodhi et al. |
| 2015/0222533 A1 | 8/2015 | Birrittella et al. |
| 2015/0242324 A1 | 8/2015 | Novakovic et al. |
| 2015/0244617 A1 | 8/2015 | Nakil et al. |
| 2015/0254182 A1 | 9/2015 | Asher et al. |
| 2015/0256405 A1 | 9/2015 | Janardhanan et al. |
| 2015/0278148 A1 | 10/2015 | Sindhu et al. |
| 2015/0278984 A1 | 10/2015 | Koker et al. |
| 2015/0280939 A1 | 10/2015 | Sindhu |
| 2015/0281128 A1 | 10/2015 | Sindhu |
| 2015/0324205 A1 | 11/2015 | Eisen et al. |
| 2015/0325272 A1 | 11/2015 | Murphy |
| 2015/0334034 A1 | 11/2015 | Smedley et al. |
| 2015/0334202 A1 | 11/2015 | Frydman et al. |
| 2015/0355946 A1 | 12/2015 | Kang |
| 2015/0378776 A1 | 12/2015 | Lippett |
| 2015/0381528 A9 | 12/2015 | Davis et al. |
| 2016/0056911 A1 | 2/2016 | Ye et al. |
| 2016/0062800 A1 | 3/2016 | Stanfill et al. |
| 2016/0092362 A1 | 3/2016 | Barron et al. |
| 2016/0164625 A1 | 6/2016 | Gronvall et al. |
| 2016/0188344 A1 | 6/2016 | Tamir et al. |
| 2016/0210159 A1 | 7/2016 | Wilson et al. |
| 2016/0239415 A1 | 8/2016 | Davis et al. |
| 2016/0241430 A1 | 8/2016 | Yadav et al. |
| 2016/0337723 A1 | 11/2016 | Graves |
| 2016/0364333 A1 | 12/2016 | Brown et al. |
| 2016/0364334 A1 | 12/2016 | Asaro et al. |
| 2016/0380885 A1 | 12/2016 | Jani et al. |
| 2017/0005921 A1 | 1/2017 | Liu et al. |
| 2017/0031719 A1 | 2/2017 | Clark et al. |
| 2017/0032011 A1 | 2/2017 | Song et al. |
| 2017/0060615 A1 | 3/2017 | Thakkar et al. |
| 2017/0061566 A1 | 3/2017 | Min et al. |
| 2017/0068639 A1 | 3/2017 | Davis et al. |
| 2017/0083257 A1 | 3/2017 | Jain et al. |
| 2017/0091096 A1 | 3/2017 | McCarthy |
| 2017/0163569 A1 | 6/2017 | Koganti |
| 2017/0187632 A1 | 6/2017 | Ko et al. |
| 2017/0235581 A1 | 8/2017 | Nickolls et al. |
| 2017/0265220 A1 | 9/2017 | Andreoli-Fang et al. |
| 2017/0286143 A1 | 10/2017 | Wagner et al. |
| 2017/0286157 A1 | 10/2017 | Hasting et al. |
| 2017/0346766 A1 | 11/2017 | Dutta |
| 2018/0011739 A1 | 1/2018 | Pothula et al. |
| 2018/0024771 A1 | 1/2018 | Miller et al. |
| 2018/0026901 A1 | 1/2018 | Sugunadass |
| 2018/0095878 A1 | 4/2018 | Katayama |
| 2018/0115494 A1 | 4/2018 | Bhatia et al. |
| 2018/0152317 A1 | 5/2018 | Chang et al. |
| 2018/0234300 A1 | 8/2018 | Mayya et al. |
| 2018/0239702 A1 | 8/2018 | Farahani et al. |
| 2018/0267923 A1* | 9/2018 | Nudejima ............... G06F 3/061 |
| 2018/0287818 A1 | 10/2018 | Goel et al. |
| 2018/0287965 A1 | 10/2018 | Sindhu et al. |
| 2018/0288505 A1 | 10/2018 | Sindhu et al. |
| 2018/0293168 A1 | 10/2018 | Noureddine et al. |
| 2018/0300928 A1 | 10/2018 | Koker et al. |
| 2018/0307494 A1 | 10/2018 | Ould-Ahmed-Vall et al. |
| 2018/0307535 A1 | 10/2018 | Suzuki et al. |
| 2018/0322386 A1 | 11/2018 | Sridharan et al. |
| 2018/0335829 A1* | 11/2018 | Mishina ............ G06F 11/3037 |
| 2018/0357169 A1 | 12/2018 | Lai |
| 2019/0005176 A1 | 1/2019 | Illikkal et al. |
| 2019/0012278 A1 | 1/2019 | Sindhu et al. |
| 2019/0012350 A1 | 1/2019 | Sindhu et al. |
| 2019/0013965 A1 | 1/2019 | Sindhu et al. |
| 2019/0018806 A1 | 1/2019 | Koufaty et al. |
| 2019/0042292 A1 | 2/2019 | Palermo et al. |
| 2019/0042518 A1 | 2/2019 | Marolia et al. |
| 2019/0095333 A1 | 3/2019 | Heirman et al. |
| 2019/0102311 A1 | 4/2019 | Gupta et al. |
| 2019/0104057 A1 | 4/2019 | Goel et al. |
| 2019/0104206 A1 | 4/2019 | Goel et al. |
| 2019/0104207 A1 | 4/2019 | Goel et al. |
| 2019/0158428 A1 | 5/2019 | Gray et al. |
| 2019/0188079 A1 | 6/2019 | Kohli |
| 2019/0243765 A1 | 8/2019 | Noureddine et al. |
| 2019/0363989 A1 | 11/2019 | Shalev et al. |
| 2020/0021664 A1 | 1/2020 | Goyal et al. |
| 2020/0021898 A1 | 1/2020 | Sindhu et al. |
| 2020/0119903 A1 | 4/2020 | Thomas et al. |
| 2020/0133771 A1 | 4/2020 | Goyal et al. |
| 2020/0145680 A1 | 5/2020 | Dikshit et al. |
| 2020/0151101 A1 | 5/2020 | Noureddine et al. |
| 2020/0159568 A1 | 5/2020 | Goyal et al. |
| 2020/0159859 A1 | 5/2020 | Beckman et al. |
| 2020/0169513 A1 | 5/2020 | Goel et al. |
| 2020/0183841 A1 | 6/2020 | Noureddine et al. |
| 2020/0259682 A1 | 8/2020 | Goel et al. |
| 2020/0280462 A1 | 9/2020 | Sindhu et al. |
| 2020/0314026 A1 | 10/2020 | Sindhu et al. |
| 2020/0356414 A1 | 11/2020 | Sindhu et al. |
| 2021/0097108 A1 | 4/2021 | Goyal et al. |
| 2021/0176347 A1 | 6/2021 | Goel et al. |
| 2021/0216457 A1* | 7/2021 | Williams ............ G06F 12/084 |
| 2021/0218665 A1 | 7/2021 | Goel et al. |
| 2021/0349824 A1 | 11/2021 | Noureddine et al. |

FOREIGN PATENT DOCUMENTS

| | | |
|---|---|---|
| CN | 104052618 A | 9/2014 |
| CN | 104521196 A | 4/2015 |
| CN | 104954247 A | 9/2015 |
| CN | 104954251 A | 9/2015 |
| CN | 105024844 A | 11/2015 |
| CN | 105847148 A | 8/2016 |
| CN | 105900406 A | 8/2016 |
| EP | 1079571 A2 | 2/2001 |

(56) References Cited

FOREIGN PATENT DOCUMENTS

| | | | |
|---|---|---|---|
| EP | 1489796 | A2 | 12/2004 |
| EP | 1501246 | A2 | 1/2005 |
| EP | 2289206 | A2 | 3/2011 |
| EP | 2928134 | A2 | 7/2015 |
| WO | 2009114554 | A2 | 9/2009 |
| WO | 2013184846 | A1 | 12/2013 |
| WO | 2014178854 | A1 | 11/2014 |
| WO | 2016037262 | A1 | 3/2016 |
| WO | 2019014268 | A1 | 1/2019 |

OTHER PUBLICATIONS

"QFX10000 Switches System Architecture," White Paper, Juniper Networks, Apr. 2015, 15 pp.
Adya et al., "Cooperative Task Management without Manual Stack Management," Proceedings of the 2002 Usenix Annual Technical Conference, Jun. 2002, 14 pp.
Al-Fares et al., "Hedera: Dynamic Flow Scheduling for Data Center Networks," NSDI'10 Proceedings of the 7th USENIX Conference on Networked Systems Design and Implementation, Apr. 28-30, 2010, 15 pp.
Alizadeh et al., "CONGA: Distributed Congestion-Aware Load Balancing for Datacenters," SIGCOMM '14 Proceedings of the 2014 ACM Conference on SIGCOMM, Aug. 17-22, 2014, pp. 503-514.
Bakkum et al., "Accelerating SQL Database Operations on a GPU with CUDA," Proceedings of the 3rd Workshop on Genral-Purpose Computation on Graphics Processing Units, Mar. 14, 2010, 10 pp.
Banga et al., "Better operating system features for faster network servers," ACM Sigmetrics Performance Evaluation Review, vol. 26, Issue 3, Dec. 1998, 11 pp.
Barroso et al., "Attack of the killer Microseconds," Communications of the ACM, vol. 60, No. 4, Apr. 2017, 7 pp.
Benson et al., "MicroTE: Fine Grained Traffic Engineering for Data Centers," CoNEXT '11 Proceedings of the Seventh Conference on emerging Networking Experiments and Technologies Article No. 8, Dec. 6-9, 2011, 12 pp.
Benson et al., "Network Traffic Characteristics of Data Centers in the Wild," IMC '10 Proceedings of the 10th ACM SIGCOMM Conference on Internet Measurement, Nov. 1-30, 2010, pp. 267-280.
Deutsch, "Deflate Compressed Data Format Specification version 1.3," IETF Network Working Group, RFC 1951, May 1996, 15 pp.
Ford et al., "TCP Extensions for Multipath Operation with Multiple Addresses," Internet Engineering Task Force (IETF), RFC 6824, Jan. 2013, 64 pp.
Friedman et al., "Programming with Continuations," Technical Report 151, Nov. 1983, 14 pp.
Gay et al., "The nesC Language: A Holistic Approach to Networked Embedded Systems," accessed from http://nescc.sourceforge.net, last updated Dec. 14, 2004, 11 pp.
Halbwachs et al., "The Synchronous Data Flow Programming Language LUSTRE," Proceedings of the IEEE, vol. 79, No. 9, Sep. 1991, 16 pp.
Haynes et al., "Continuations and Coroutines," Technical Report No. 158, Jun. 1984, 19 pp.
Hewitt, "Viewing Control Structures as Patterns of Passing Messages," Massachusetts Institute of Technology, Artificial Intelligence Laboratory, Dec. 1976, 61 pp.
Hseush et al., Data Path Debugging: Data-Oriented Debugging for a Concurrent Programming Language, PADD '88 Proceedings of the 1988 ACM SIGPLAN and SIGOPS workshop on Parallel and distributed debugging, May 5-6, 1988, 12 pp.
Huang et al., "Erasure Coding in Windows Azure Storage," 2012 USENIX Annual Technical Conference, Jun. 13-15, 2012, 12 pp.
Hurson, "Advances in Computers, vol. 92," Jan. 13, 2014, Academic Press, XP055510879, 94-95 pp.
International Preliminary Report on Patentability from International Application No. PCT/US2018/026873, dated Jul. 18, 2019, 28 pp.
International Search Report and Written Opinion of International Application No. PCT/US2018/026873, dated Jun. 27, 2018, 17 pp.
Isen et al., "ESKIMO—Energy Savings using Semantic Knowledge of Inconsequential Memory Occupancy for DRAM subsystem," 42nd Annual IEEE/ACM International Symposium on Microarchitecture (MICRO), Dec. 12-16, 2009, 10 pp.
Kahn et al., "Actors as a Special Case of Concurrent Constraint Programming," ECOOP/OOPSLA '90 Proceedings, Oct. 21-25, 1990, 10 pp.
Kaminow, "Optical Integrated Circuits: A Personal Perspective," Journal of Lightwave Technology, vol. 26, No. 9, May 1, 2008, pp. 994-1004.
Kandula et al., "Dynamic Load Balancing Without Packet Reordering," SIGCOMM Computer Communication Review, vol. 37, No. 2, Apr. 2007, pp. 53-62.
Kandula et al., "The Nature of Datacenter Traffic: Measurements & Analysis," IMC '09 Proceedings of the 9th ACM SIGCOMM conference on Internet measurement, Nov. 4-6, 2009, pp. 202-208.
Kelly et al., A Block Diagram Compiler, The Bell System Technical Journal, Dec. 7, 1960, 10 pp.
Kounavis et al., "Programming the data path in network processor-based routers," Software—Practice and Experience, Oct. 21, 2003, 38 pp.
Larus et al., "Using Cohort Scheduling to Enhance Server Performance," Usenix Annual Technical Conference, Jun. 2002, 12 pp.
Levis et al., "Tiny OS: An Operating System for Sensor Networks," Ambient Intelligence, Jan. 2005, 34 pp.
Lin et al., A Parameterized Dataflow Language Extension for Embedded Streaming Systems, 2008 International Conference on Embedded Computer Systems: Architectures, Modeling, and Simulation, Jul. 21-24, 2008, 8 pp.
Mishra et al., "Thread-based vs Event-based Implementation of a Group Communication Service," Proceedings of the First Merged International Parallel Processing Symposium and S mosium on Parallel and Distributed Processin, Mar. 30-Apr. 3, 1998, 5 pp.
Prosecution History from U.S. Appl. No. 15/949,692, dated May 23, 2019 through Dec. 30, 2019, 60 pp.
Prosecution History from U.S. Appl. No. 15/949,892, dated Jun. 26, 2019 through Nov. 5, 2019, 34 pp.
Prosecution History from U.S. Appl. No. 16/746,344, now issued US. Pat. No. 11,048,634, dated Mar. 2, 2021, 11 pp.
Prosecution History from U.S. Appl. No. 16/791,957, now issued U.S. Pat. No. 11,360,895, dated Aug. 25, 2021 through May 13, 2022, 34 pp.
Raiciu et al., "Improving Datacenter Performance and Robustness with Multipath TCP," ACM SIGCOMM Computer Communication Review—SIGCOMM '11, vol. 41, No. 4, Aug. 2011, pp. 266-277.
Response to Second Written Opinion dated Mar. 15, 2019, from International Application No. PCT/US2018/026873, dated May 15, 2019, 6 pp.
Response to Written Opinion dated Jun. 27, 2018, from International Application No. PCT/US2018/026873, dated Feb. 8, 2019, 18 pp.
Schroeder et al., "Flash Reliability in Production: The EXpected and the Unexpected," 14th USENIX Conference on File and Storage Technologies (FAST '16), Feb. 22-25, 2016, 15 pp.
Second Written Opinion of International Application No. PCT/US2018/026873, dated Mar. 15, 2019, 13 pp.
Varela et al., "The Salsa Programming Language 2.0.0alpha Release Tutorial," Tensselaer Polytechnic Institute, Nov. 2009, 52 pp.
Von Behren et al., "Why Events Are a Bad Idea (for high-concurrency servers)," Proceedings of HotOS IX, May 2003, 6 pp.
Wang et al., "A Spatial and Temporal Locality—Aware Adaptive Cache Design with Network Optimization for Tiled Many-Core Architectures," IEEE Transactions on Very Large Scale Interation (VLSI) Systems, vol. 25. No. 9, Sep. 2017, pp. 2419-2433
Welsh et al., "SEDA: An Architecture for Well-Conditioned, Scalable Internet Services," Eighteenth Symposium on Operating Systems Principles, Oct. 21-24, 2001, 14 pp.
Zhu et al., "Congestion Control for Large-Scale RDMA Deployments," SIGCOMM '15 Proceedings of the 2015 ACM Conference on Special Interest Group on Data Communication, Aug. 17-21, 2015, pp. 523-536.

(56) References Cited

OTHER PUBLICATIONS

Notice of Allowance from U.S. Appl. No. 17/360,619 dated Dec. 1, 2022, 11 pp.

Patterson et al., "Chapter 16: Informed Prefetching and Caching," Proceedings of the 5th International Symposium on High Performance Computer Architecture, Jan. 1999, pp. 224-244.

"Notice of Allowance Issued in U.S. Appl. No. 17/360,619", dated Apr. 5, 2023, 11 Pages.

Falahati, et al., "ISP: Using Idle SMs in Hardware-based Prefetching", In Proceeding of 17th CSI International Symposium on Computer Architecture & Digital Systems, Oct. 30, 2013, pp. 3-8.

\* cited by examiner

MEMORY MANAGEMENT IN A MULTIPLE PROCESSOR SYSTEM

CROSS REFERENCE

This application is a continuation application of and claims priority to U.S. patent application Ser. No. 16/791,957 filed on Feb. 14, 2020, set to issue as U.S. Pat. No. 11,360,895, which is a continuation application of and claims priority to U.S. patent application Ser. No. 15/949,892 filed on Apr. 10, 2018, now U.S. Pat. No. 10,565,112, and which claims the benefit of U.S. Provisional Patent Application No. 62/483,844 filed on Apr. 10, 2017 and U.S. Provisional Patent Application No. 62/625,518 filed on Feb. 2, 2018. The entire content of all of these applications is incorporated herein by reference.

TECHNICAL FIELD

This disclosure relates to multi-processor systems for processing packets of information, for example, in the fields of networking and storage

BACKGROUND

Network devices, e.g., firewalls, switches, routers, storage/compute servers or other network attached devices often utilize multiple core processor systems or multiple-processing unit systems to achieve increased performance. However, processing streams of data, such as network packets, with systems having multiple processing units can present many programming challenges. For example, it is often difficult to move processing of a packet or set of packets from one processing unit to another, such as for load balancing across the processing units. Transitioning program execution from one processing unit to another can be difficult and often requires brute force movement or mapping of state, cached data, and other memory pieces associated with the program execution. Maintaining consistency of cached data and other memory across processing units while achieving high-throughput and utilization is often extremely technically challenging. For example, when using coherent memory, significant processing overhead and delays may result from operations performed by a memory coherence protocol. When using non-coherent memory, the overhead of the coherence protocol is avoided, but some processing units might not have access to data cached by another processing unit.

For example, memory can be shared in multiprocessor or multi-core systems having two or more simultaneously operating processors, each having one or more local memory caches. However, if one processor or core changes data at a particular memory location, procedures generally exist to notify all processors or cores of the change, to invalidate the respective local memory caches or refresh the caches with the updated information. This procedure is commonly known as a memory coherence protocol, and memory operating in accordance with the protocol is known as coherent memory. Typically, supporting coherent memory requires tracking cache line state and handling associated transactions for all memory blocks that are cached within the processor or processing cores and other elements of the system.

In contrast, non-coherent memory does not provide for tracking and updating data to maintain cache coherency. Without the processing overhead and delays associated with conventional coherent memory systems, memory access and utilization can be very fast and efficient. There is a large body of applications that do not benefit from a coherent memory system, particularly ones that process data linearly (e.g., process once, therefore have accesses with poor temporal locality). These "stream" applications, such as networking and storage infrastructure workloads, are increasingly important in large scale datacenters. For such applications, using a coherent memory system tends to result in significant overhead with little benefit in return.

SUMMARY

Techniques are described in which a system having multiple processing units processes a series of work units in a processing pipeline, where some or all of the work units access or manipulate data stored in non-coherent memory. In some examples, processing units may be processing cores, and in other examples, processing units may be virtual processors, hardware threads, hardware blocks, or other sub-processing core units. As described herein, a processing unit may perform operations on data as specified by a work unit. While processing the work unit, the processing unit may cache data from non-coherent memory into a segment of a cache associated with the processing unit, and perform operations specified by the work unit using that cached data. Once the work unit has completed processing, the processing unit may initiate a cache flush for the segment (or a portion of the segment) to write the dirty cache data back to the non-coherent memory. Transfer of ownership of the non-coherent memory or a portion of the non-coherent memory may be mediated by delivery of a work unit message to another processing unit. The delivery of the work unit message may be interlocked with (gated by) the flush of the data in the relevant cache segment.

In one example, this disclosure describes a relay consistent memory management method, comprising: receiving a first work unit for execution by a first processor of a multi-processor system having the first processor and a second processor coupled to a memory system; executing the first work unit, with the memory system being accessed; generating a second work unit for execution by the second processor upon execution of the first work unit; updating the memory system; and providing relay consistency by delaying processing of the second work unit by the second processor until the memory system is updated.

In another example, this disclosure describes a data processing system, comprising: a memory system; a first processor able to access a memory system, receive a first work unit for execution, and generate a second work unit for execution by a second processor upon execution of the first work unit; a memory management system connected to the first processor and able to update the memory system, wherein execution of the second work unit by the second processor occurs after memory system update to provide relay consistency.

In another example, this disclosure describes a stream processing system, comprising: multiple processors configured to accept and stream information, including a first processor able to access a memory system, receive a first work unit for execution, and generate a second work unit for execution by a second processor upon execution of a first work unit; a memory management system connected to the first processor and able to update the memory system, wherein execution of the second work unit by the second processor occurs after memory system update to provide relay consistency.

In another example, this disclosure describes a system comprising: a multi-processor system having a first processing unit and a second processing unit; and a memory system having coherent memory and non-coherent memory accessible by both the first processing unit and the second processing unit, wherein the memory system is configured to maintain cache coherency of the first processing unit and the second processing unit for the coherent memory without maintaining cache coherency for the first processing unit and the second processing unit with respect to the non-coherent memory; wherein the first processing unit is configured to: execute a first work unit, wherein executing the first work unit includes accessing data stored in the non-coherently memory of the memory system, generate a second work unit for execution by the second processing unit, update a portion of the non-coherent memory of the memory system, and transfer ownership of the portion of the non-coherent memory of the memory system to the second processing unit upon completion of the update; and wherein the second processing unit is configured to: delay execution of the second work unit before the first processing unit transfers ownership of the portion of the non-coherent memory of the memory system, and execute, after the first processing unit transfers ownership of the portion of the non-coherent memory of the memory system, the second work unit, wherein executing the second work unit includes accessing data stored in the portion of the non-coherent memory of the memory system.

The details of one or more examples are set forth in the accompanying drawings and the description below. Other features, objects, and advantages of the disclosure will be apparent from the description and drawings, and from the claims.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The present disclosure describes a system that supports a memory model that provides for consistent ordering of memory operations at multiple memory address locations with respect to multiple processors. Since information relating to consistent memory operations is relayed between processors, this memory model and memory management system is herein referred to as "relay consistent" and is well suited for "stream" applications that process data using a succession of processors. In one embodiment, a system has a first and a second processor, with each processor able to access a memory system. A first work unit is received for execution by the first processor, with the memory system being accessed. A second work unit is generated for execution by a second processor upon execution of a first work unit. Only after the memory system is updated does processing of the second work unit by the second processor occur. This work unit message based ordering provides relay consistency for memory operations of multiple processors. As discussed in this disclosure, processors can include, but are not limited to general purpose processors, multi-core processors, individual cores, co-processors, specialized computational hardware such as cryptographic or graphical processors, virtual processers, process threads, and/or any other suitable logic component or process capable of computational tasks.

As described herein, processing of stream information may be associated with a "work unit." As one example, a Work Unit (WU) is a container that is associated with a stream state and used to describe (i.e. point to) data within a stream (stored in memory) along with any associated meta-data and operations to be performed on the data. For example, work units may dynamically originate within a peripheral unit of coupled to the multi-processor system (e.g. injected by a networking unit, a host unit, or a solid state drive interface), or within a processor itself, in association with one or more streams of data, and terminate at another peripheral unit or another processor of the one of system. The work unit is associated with an amount of work that is relevant to the entity executing the work unit for processing a respective portion of a stream.

The described system can also support coherent memory caching for certain operations. Commonly, data requiring coherent memory is often processor generated "flow data". Flow data structure benefits from coherent memory, primarily because multiple processors or cores need to access and modify the flow data. For example, information carried by a flow can include state for stateful protocols, counters to count the number of packets inspected, state for error handling protocols, and other computationally useful data.

Stream processing is a type of data processing architecture well suited for high performance and high efficiency processing. A stream is defined as an ordered, unidirectional sequence of computational objects that can be of unbounded or undetermined length. In a simple embodiment, a stream originates in a producer and terminates at a consumer, and is operated on sequentially. In some embodiments, a stream can be defined as a sequence of stream fragments; each stream fragment including a memory block contiguously addressable in physical address space, an offset into that block, and a valid length.

Streams can be discrete, such as a sequence of packets received from the network, or continuous, such as a stream of bytes read from a storage device. A stream of one type may be transformed into another type as a result of processing. For example, TCP receive (Rx) processing consumes segments (fragments) to produce an ordered byte stream. The reverse processing is performed in the transmit (Tx) direction. Independently of the stream type, stream manipulation requires efficient fragment manipulation, where a fragment is as defined above.

An application may operate on a stream in three broad ways: the first is protocol processing, which consists of operating on control information or headers within the stream; the second is payload processing, which involves significant accessing of the data within the stream; and third is some combination of both control and data access. A particularly important case of protocol processing is network packet processing, which must be very high performance to absorb incoming traffic at line rate. Traditional, host side data delivery can also be mapped to the stream model. For example, delivery to network interface card (NIC) buffers in host memory involve consuming a stream of packet buffers (fragments), and generating a stream of completions that consume a stream of notification buffers. Similarly, delivery to application buffers (e.g. SCSI buffers) involves consuming a stream of scatter descriptors (fragments) to place the stream of received payload.

Figure 1A:
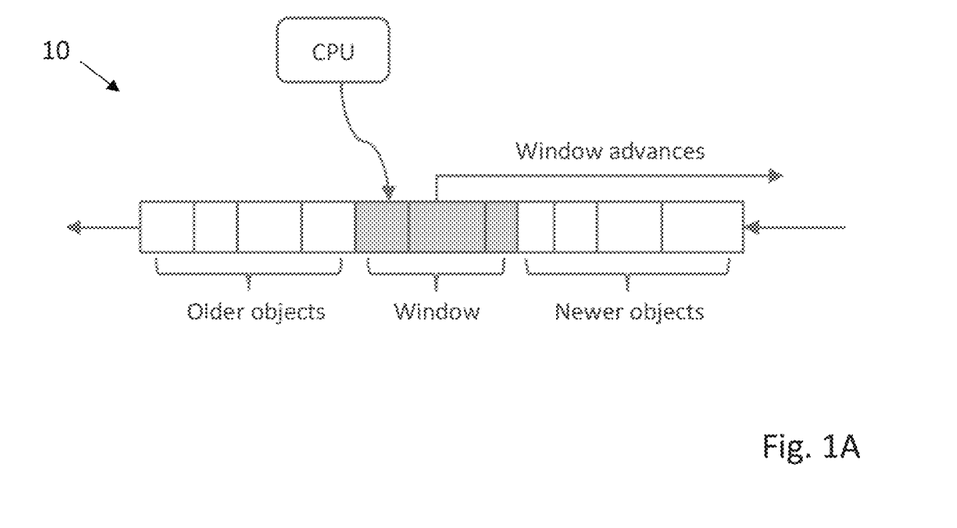
FIG. 1A is a block diagram illustrating one aspect of stream processing.

As seen with respect to system 10 of FIG. 1A, stream processing is a specialized type of conventional general-purpose processing supporting specialized limitations with regard to both access and directionality. Processing typically only accesses a limited portion of the stream at any time, called a "window", within which it may access random addresses. In contrast, general purpose processing views the whole memory as randomly accessible at any time. Objects outside of the window are not accessible through a streaming interface. Stream processing generally progresses in one direction, called the forward direction, or from left to right in FIG. 1A. Backward movements of the window are possible, but are typically not common.

Figure 1B:
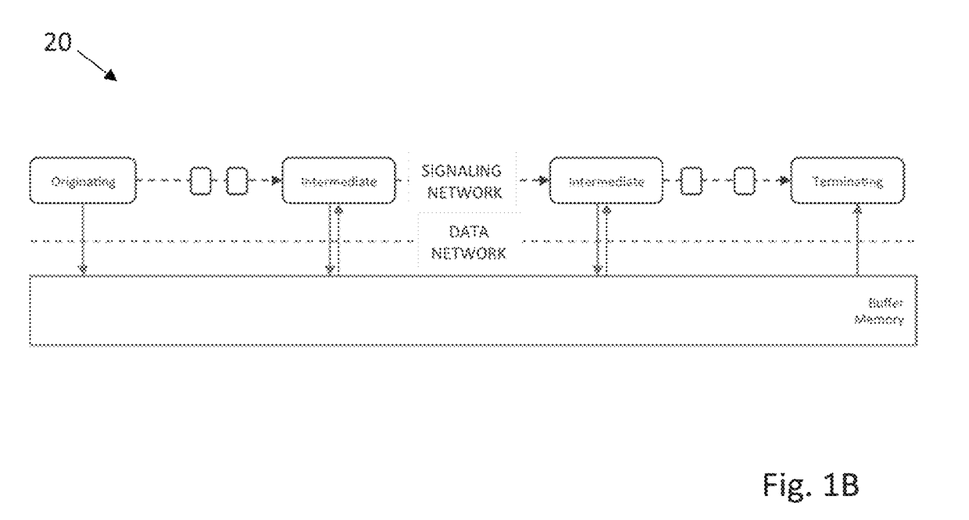
FIG. 1B is a block diagram illustrating a processing and memory system compatible with work unit processing.

In the disclosed embodiment illustrated with respect to system 20 of FIG. 1B, processing of stream information can be associated with a "work unit". As noted above, a work unit can be a container that is associated with a stream state and used to describe (i.e. point to) data within a stream (stored in memory), associated meta-data, and operations to be performed on the data. Work units originate within a peripheral unit (e.g. injected by a network unit, a host unit, or a solid state drive interface), or within a processor, and terminate at a peripheral unit or a processor. The work unit is associated with an amount of work that is relevant to the entity executing the work unit. Within a system, work units may be executed by processor cores, hardware blocks, I/O interfaces, or other computational processing units. For instance, a processor core executes a work unit by accessing memory and performing a computation. A component of a system may receive, execute or generate work units.

Stream processing can be divided into work units executed at a number of intermediate processors (or none) between source and destination. Depending on the amount of work to be performed at each stage, the number and type of intermediate processors that are involved can vary. For example, processing an encrypted stream may involve a cryptographic processor, which is not required in processing a clear text stream Transfer of ownership of a memory buffer may be mediated by a work unit message, which in some embodiments can be a small message that is delivered, using an on-chip fabric, to the processing core as a low latency notification. A pointer to a buffer can be included for processing. As an example, a work unit message may be a 4-word message.

The first word may be a header, containing information necessary for message delivery, and information used for work unit execution, such as a pointer to a function for execution by a processor core. Other words may contain parameters to be passed to the function call, such as pointers to data in memory, parameter values, or contain other information used in executing the work unit. The work unit message header may specify a core that processes the work unit corresponding to a packet. The work unit message may contain a parameter that is the address of the memory where the packet is stored. Another parameter may contain information associated to the packet by the interface block. In one embodiment, receiving a work unit is signaled by receiving a message in a work unit receive queue. A work unit queue is associated with a processing element, such as a core, and is addressable in the header of the work unit message. A core can generate a work unit message by executing store instructions to addresses mapped to a work unit transmit queue. The store instructions write the contents of the message to the queue. The release of a work unit message may be interlocked with (gated by) flushing of the core's dirty cache data.

Each work unit message may be delivered (including signaling, e.g., fast interrupt) such that processing by a processor may start very quickly after a work unit message is received. The utilization of work unit messages as a way of messaging to ensure the synchronization of the non-coherent memory system is done automatically when the execution control is passed from executing one work unit message to executing another. An example of utilization of work unit messages for a smooth flow of operations in a network unit is provided below.

In one example, a network unit of a multi-core processor may receive a networking packet at first time. The network unit may allocate space in a buffer memory and may fill the allocated buffer memory space with bits from the networking packet by performing a write operation into the buffer memory. The buffer memory may send an acknowledgment to the network unit at a second time. Then, the network unit may send a first work unit message to a first processor core, to start processing of the networking packet. The first core may determine what the flow of operations may be for this particular packet, and this may take place. There may be a few read and/or write operations involved during this time frame. Then, first core may send a second work unit message to a second core, which may be the core responsible for processing packets of that flow. The processing by second core may then take place. Next, higher-level processing (e.g., deep packet inspection) may take place, and a third work unit message may be sent from a second core to a third core. Processing by third core may be completed, and subsequently, the third core may send a fourth work unit message to a host unit. There may also be a number of transactions to free up the allocated buffer memory. Communication via work unit messages may be utilized to ensure the synchronization of the non-coherent memory system is done automatically when the execution control is passed from executing one message by one core to executing another message by another core.

Advantageously, operating on streams, pipelined processors, or other synchronizable computational units using work units serves several purposes. Data movement can be minimized by exchanging and operating on pointers as much as possible. Processing efficiency is improved due to conveyance of useful meta-data, such as processing results and control state. Atomic and consistent processing of packets and associated data is enabled, as is natural pipelining and flow control by subdividing the stream into self-contained work elements that are moved at each step in relation to computational consumption rate of downstream stages.

Figure 1C:
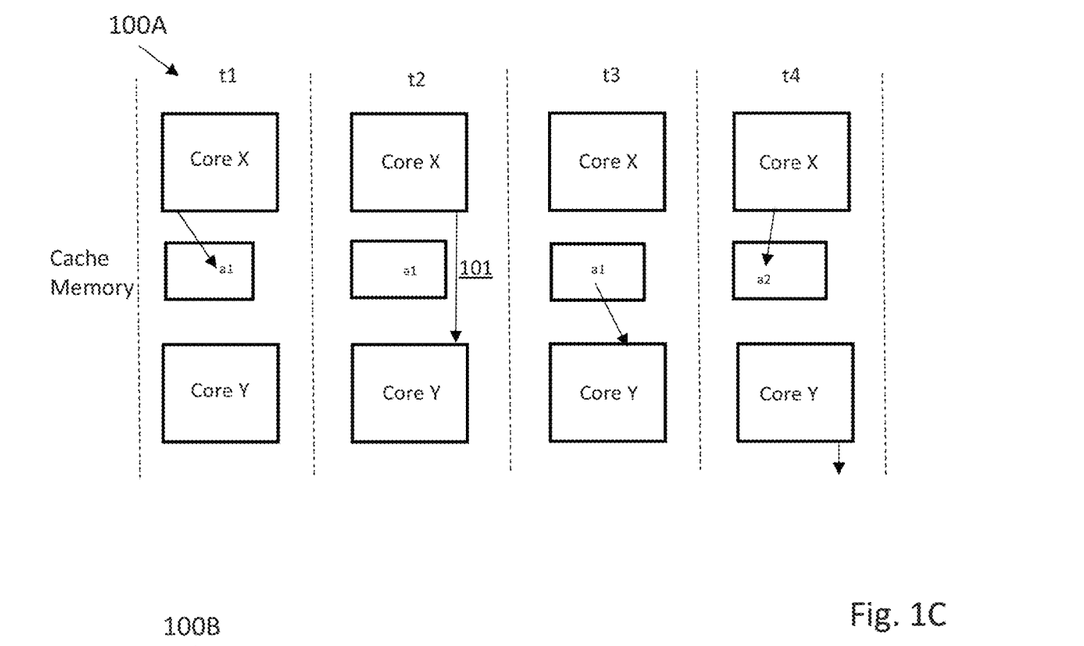
FIG. 1C is a block diagram illustrating cache memory access by multiple cores.

FIG. 1C illustrates operation of a data processing system 100A having multiple processors X and Y operating over times t1, t2, t3, t4, etc., to read and write from a memory system. Processors can include connected standalone processors, each processor on a single die, multiple processor cores on a single die, or connected arrangements of one or more standalone processors and processor cores. Execution of tasks can be passed or relayed between cores in a virtual pipeline, represented in the Figure by the arrows extending between a core X and Core Y at time t2. Consistency of data with respect to multiple memory caches in the memory system can be partially maintained by relaying messages between processors X and Y, with data at selected addresses being updated at applicable intervals. In this embodiment, a processor core X can write data to an address a1 in cache memory during a time interval t1. In time interval t2, execution of task relevant to data held at address a1 can be finished, and a message relayed to Core Y indicating validity of data at address a1 (as indicated by the arrow 101). At time interval t3, Core Y is able to process data, and is able rely on validity of data held at address a1 without updating the cache and flushing cache lines because of the earlier transmitted message 101. At time interval t4, Core X can place data at a new address a2, and Core Y can relay data and messages to another processor (not shown). Timing of cache memory updates in a system such as illustrated in FIG. 1C can be used to improve overall speed of data processing operations.

Figure 1D:
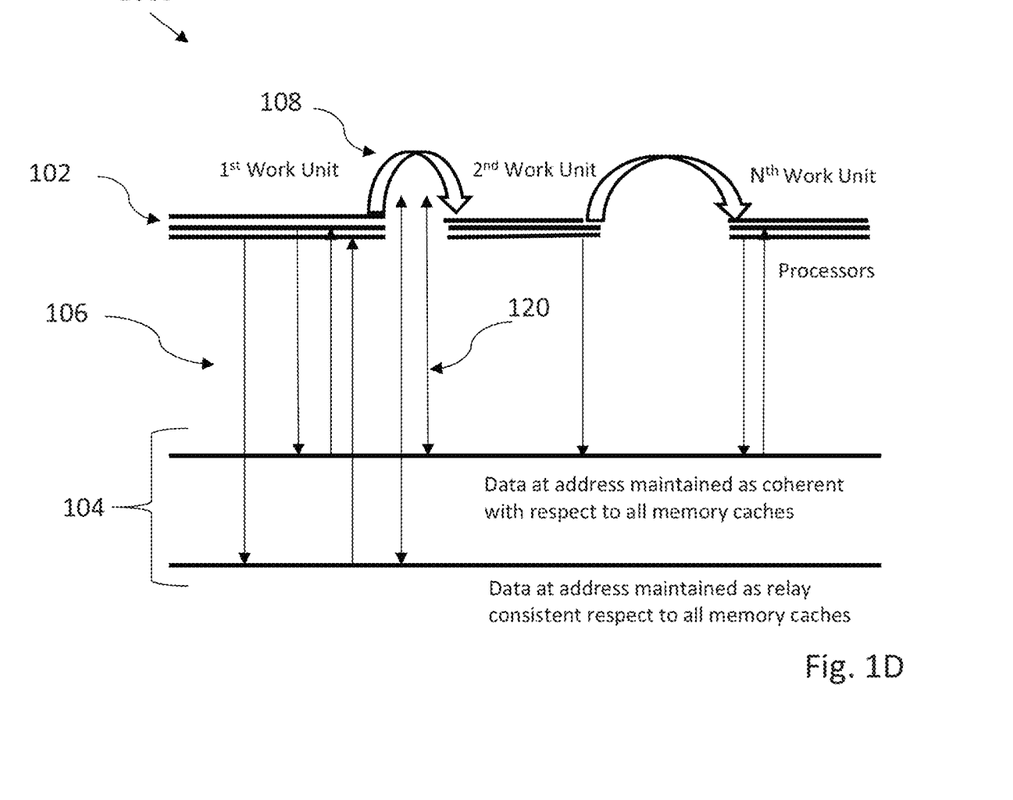
FIG. 1D is a diagram illustrating work unit processing.

FIG. 1D illustrates operation of a data processing system 100B operating (as indicated by lines 102) to read and write from a memory system (lines 14). In certain embodiments, hundreds of processors and/or processor cores can access (e.g. read or write) memory, as indicated by arrows 106. Operation of the processors is divided into discrete work units designated here as $1^{st}$ work unit, $2^{nd}$ work unit, and indefinitely extending to $N^{th}$ work unit. Each work unit typically constitutes hundreds of operations. Processor access to memory is managed (indicated by curved arrow 18) between work units to allow for cache flush interlock, cache line flushing, and updating for data requiring system wide coherency.

Figure 2:
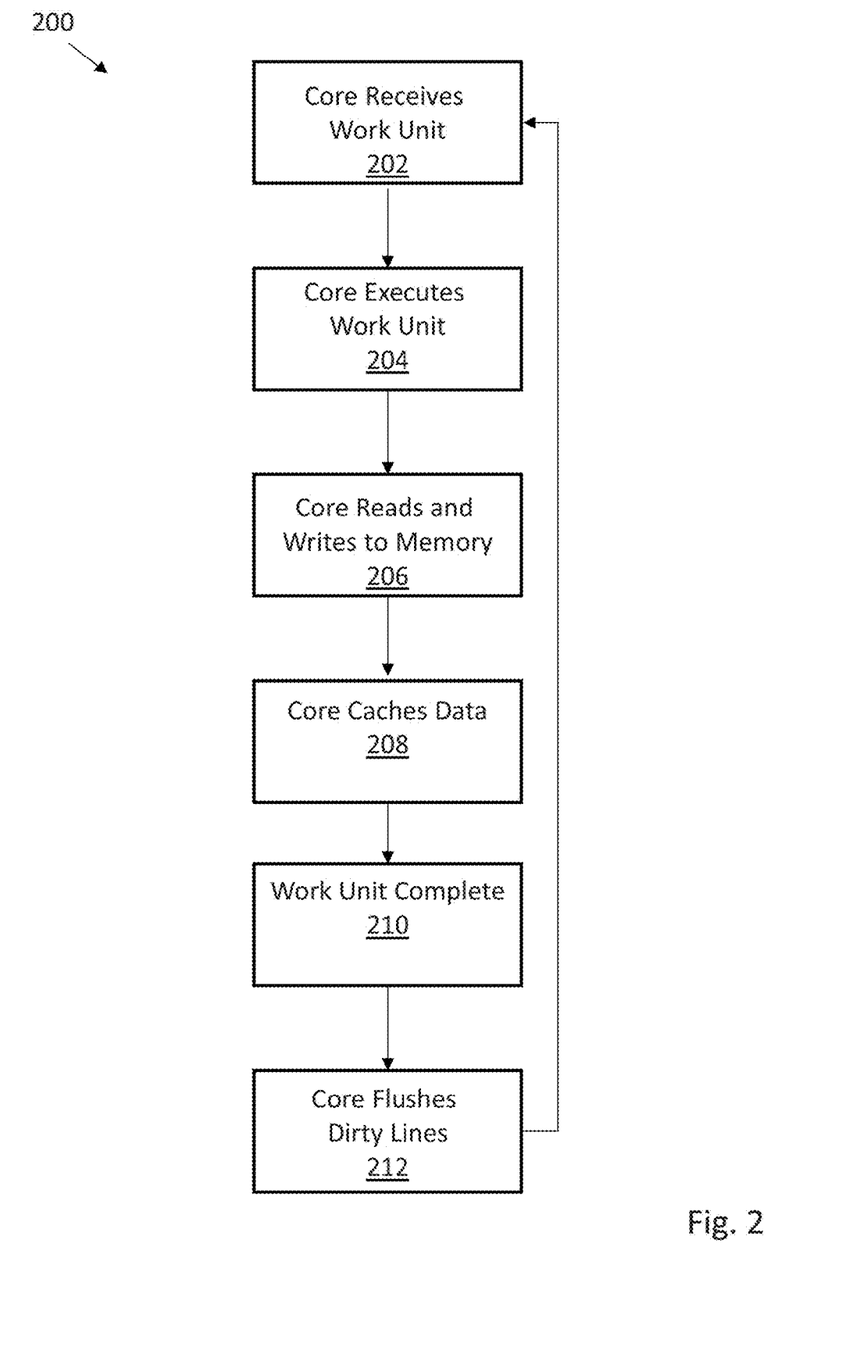
FIG. 2 is a flow chart illustrating a method for processing a work unit.
Figure 3:
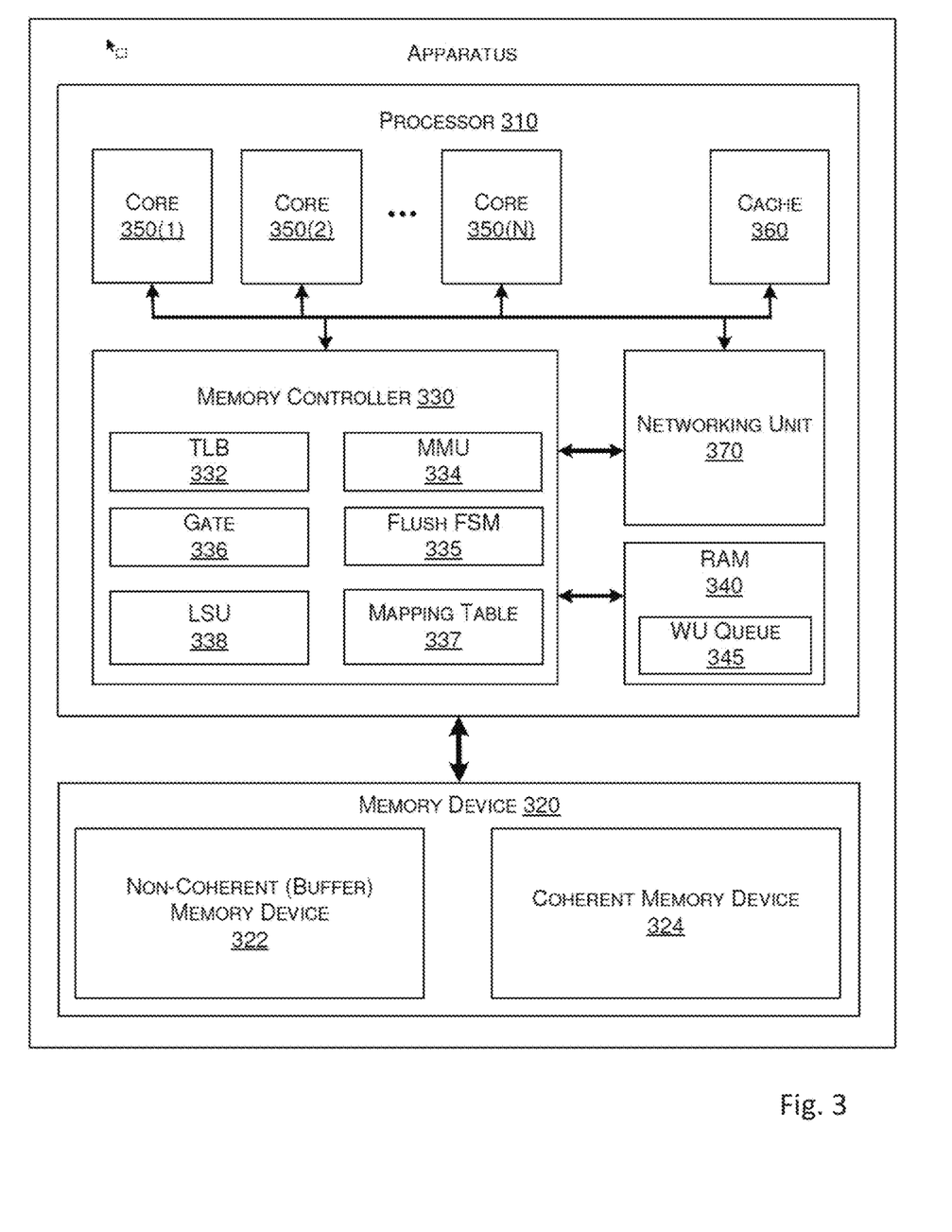
FIG. 3 is a block diagram of an example apparatus in accordance with an embodiment of the present disclosure.

FIG. 2 illustrates one embodiment of a method 200 for handling memory access. In step 202, a first core receives a first work unit. In step 204 the first core executes the first work unit, which typically requires multiple reads and writes to memory (step 206). In step 208, a local cache associated with the first core caches data. While the first work unit is executing, this cache is not operated to maintain consistency with other caches in the system. When the first work unit execution is completed (step 210), a second work unit is prepared and passed onto a second processor core along with messages indicating ownership of data at selected addresses. The first core requests the cache to flush any dirty lines (step 212) and receives a new work unit (step 202) to continue data processing operations. This cache flush interlock system effectively provides for work unit message passing to be gated by cache flushing FIG. 3 illustrates an example apparatus 300 in accordance with an embodiment of the present disclosure. In some embodiments, apparatus 300 may be an electronic apparatus or a component thereof, and the electronic apparatus may be, for example and not limited to, a smartphone, a smart wearable apparatus, a mobile or otherwise portable apparatus, an imaging apparatus, or a computing apparatus such as a tablet computer, a laptop computer, a notebook computer, a desktop computer or a server. In some embodiments, apparatus 300 may be implemented in the form of one or more IC chips such as, for example and not limited to, one or more multi-core central processing units (CPUs) or multi-core processors.

Apparatus 300 may include some or all of those components shown in FIG. 3. For instance, apparatus 300 may include a multi-core processor 310 (hereinafter interchangeably referred as "processor 310") and a memory device 320. Memory device 320 may include two types of memories or memory devices, namely: non-coherent (buffer) memory device 322 and coherent memory device 324. Processor 310 may include a plurality of cores 350(1)-350(N), with N being a positive integer greater than 1. Processor 310 may also include a memory controller 330 and a networking unit 370. Processor 310 may further include a random-access memory (RAM) 340 and a cache 360. Each component of apparatus 300 may be implemented partially or completely in hardware form. For instance, each component of apparatus 300 may include electronic circuit(s) formed by one or more transistors, one or more diodes, one or more resistors, one or more capacitors, one or more inductors, one or more varactors and/or one or more memristors.

Each of the cores 350(1)-350(N) may be configured, adapted, designed or otherwise arranged to process one or more events or activities related to a given data packet such as, for example, a networking packet or a storage packet. Networking unit 370 may be configured, adapted, designed or otherwise arranged to receive one or more data packets from and to transmit one or more data packets to one or more external devices. RAM 340 may function as a messaging interface and may include an egress work unit (WU) queue 345.

Memory controller 330 may be communicatively coupled to memory device 320 (including non-coherent memory device 322 and coherent memory device 324), cores 350(1)-350(N), networking unit 370, RAM 340 and cache 360. Memory controller 330 may control access to memory device 320 by cores 350(1)-350(N) and any number of external clients. Memory controller 330 may be configured, adapted, designed or otherwise arranged to perform a number of operations to render memory management in accordance with the present disclosure. Accordingly, referring to FIG. 3, memory controller 330 is shown to include the functional blocks of translation lookaside buffer (TLB) 332, memory management unit (334), gate 336, flush finite state machine (FSM) 335, load/store unit (LSU) 338 and mapping table 337.

In some embodiments, memory controller 330 may be capable of mapping accesses from one of the cores 350(1)-350(N) to either of non-coherent memory device 322 and coherent memory device 324. In some embodiments, in mapping the accesses, memory controller 330 may map the accesses based on one or more criteria. For instance, the criteria may include an address range, an instruction or an operation code within the instruction, a special access, or a combination thereof.

In some embodiments, memory controller 330 may be capable of mapping a virtual address to a physical address for non-coherent memory device 322 by performing a number of operations. For instance, memory controller 330 may map to a buffer memory of non-coherent memory device 322 using a TLB entry for a discrete stream of data packets. Moreover, memory controller 330 may map to a stream handle using the TLB entry for a continuous stream of data packets.

In some embodiments, memory controller 330 may be capable of flushing modified cache lines associated with a buffer memory of non-coherent memory device 322 after use by a first core of the plurality of cores 350(1)-350(N). Moreover, memory controller 330 may be capable of transferring ownership of the buffer memory to a second core of the plurality of cores 350(1)-350(N) after the flushing.

In some embodiments, memory controller 330 may be capable of transferring ownership of a segment of the plurality of segments from a first core of the plurality of cores 350(1)-350(N) to a second core of the plurality of cores 350(1)-350(N) by performing a number of operations. For instance, memory controller 330 may hold onto a message generated by the first core. Additionally, memory controller 330 may flush the segment upon the first core completing an event using the segment. Furthermore, memory controller 330 may provide the message to the second core in response to both of: (1) there being no outstanding write operations for the segment, and (2) the segment not being flushed currently.

In some embodiments, the plurality of cores 350(1)-350(N) may be capable of processing a plurality of events related to each data packet of the one or more data packets, received by networking unit 370, in a sequential manner using one or more work unit messages. In some embodiments, in processing the plurality of events related to each data packet, a first core of the plurality of cores 350(1)-350(N) may process a first event of the plurality of events. Moreover, the first core may provide to a second core of the plurality of cores 350(1)-350(N) a first work unit message of the one or more work unit messages. Furthermore, the second core may process a second event of the plurality of events in response to receiving the first work unit message from the first core.

Figure 4:
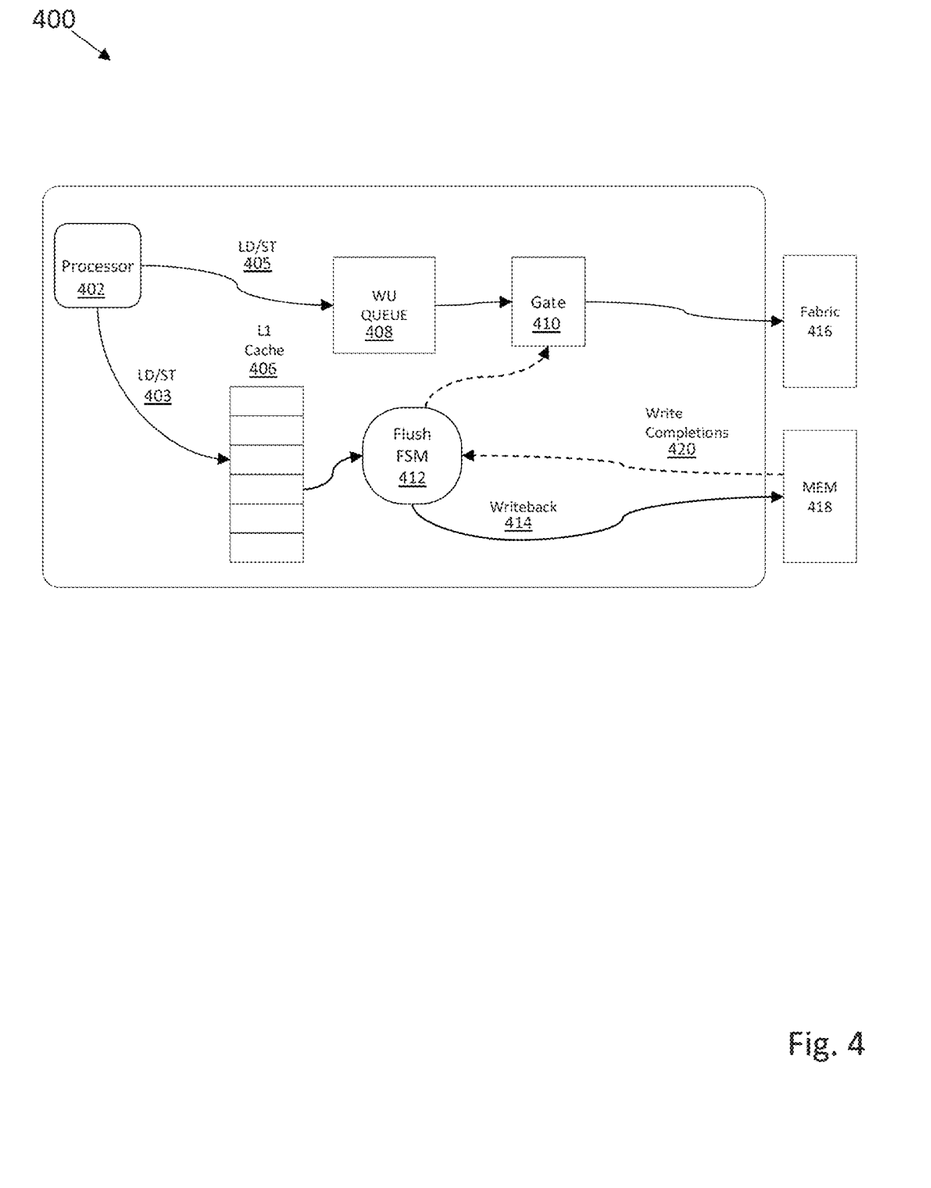
FIG. 4 is a diagram illustrating an example functional block of an embodiment.

FIG. 4 shows relevant functional blocks of a portion of a multi-processor system 400 for cache flush interlock with work unit messaging support. In this example, a processor 402 can access an L1 cache 406 or a work unit (WU) queue 408 through the load store units (LD/ST 403 and 405). The work unit queue is interlocked with a gate 410 that prevents passing of messages and data to a fabric 416 unless the Flush Finite State Machine (FSM) 412 has received indications of write completions 420 in response to earlier writebacks 414 to MEM 418. As will be appreciated, since the flush and the message go to different interfaces, proper interlocking is needed between the flush request setting the "flush in progress" indication and the message appearing at the wait station.

Further information relating to aspects of this disclosure are available in U.S. Provisional Patent Application No. 62/514,583, filed Jun. 2, 2017, entitled "Non-Blocking Any-to-Any Data Center Network with Packet Spraying Over Multiple Alternate Data Paths,", U.S. Provisional Patent Application No. 62/530,591, filed Jul. 10, 2017, entitled "Data Processing Unit for Computing Devices,", U.S. Provisional Patent Application No. 62/559,021, filed Sep. 15, 2017, entitled "Access Node for Data Centers,", U.S. Patent Application Ser. No. 62/589,427, filed Nov. 21, 2017 and U.S. Provisional Patent Application No. 62/625,518, filed Feb. 2, 2018, entitled "Efficient Work Unit Processing in a Multicore System,", the entire content of each of which is incorporated herein by reference.

The articles "a" and "an" are used herein to refer to one or to more than one (i.e., to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code or the like), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A computing system comprising a first processing unit, a second processing unit, and shared memory, and wherein the computing system is configured to:
    enable the first processing unit to modify data in the shared memory, including:
        accessing the data in the shared memory,
        storing the data in a cache associated with the first processing unit, modifying the data in the cache to yield updated data, and
flushing the cache to store the updated data in the shared memory;
receive an indication that modifying data in the shared memory is complete;
after receiving the indication that modifying the shared memory is complete, deliver a message to the second processing unit, wherein the message specifies operations that access the shared memory; and
enable, after delivering the message, the second processing unit to execute the operations that access the shared memory.

2. The computing system of claim 1, wherein to enable the second processing unit to execute the operations, the computing system is configured to:
gate the delivery of the message by the first processing unit flushing the cache.

3. The computing system of claim 1, wherein to execute the operations that access the shared memory, the second processing unit is configured to:
access the updated data from the shared memory;
store the updated data in a cache associated with the second processing unit;
modify the updated data in the cache; and
flush the cache to store further updated data in the shared memory.

4. The computing system of claim 1, wherein the computing system is further configured to:
transfer ownership of at least a portion of the shared memory to the second processing unit through the delivery of the message to the second processing unit.

5. The computing system of claim 1, wherein to deliver a message to the second processing unit, the computing system is further configured to:
delay delivery of the message to the second processing unit while the first processing unit flushes the cache associated with the first processing unit.

6. The computing system of claim 1, wherein the message is a work unit message, and wherein the computing system is further configured to:
identify the work unit message; and
determine that the work unit message designates the second processing unit to execute the operations that access the shared memory.

7. The computing system of claim 1, wherein to enable the second processing unit to execute the operations, the computing system is configured to:
release the message to the second processing unit.

8. The computing system of claim 1, wherein to modify the data in the shared memory, the first processing unit is configured to:
process data included within a network packet.

9. A storage device for storing computer-readable instructions that, when executed, configure processing circuitry of a computing system to:
enable a first processing unit included within the computing system to modify data in shared memory included within the computing system, including:
accessing the data from the shared memory,
storing the data in a cache associated with the first processing unit,
modifying the data in the cache, and
flushing the cache to store updated data in the shared memory;
receive an indication that modifying data in the shared memory is complete;
after receiving the indication that modifying the shared memory is complete, deliver a message to a second processing unit included within the computing system, wherein the message specifies operations that access the shared memory; and
enable, after delivering the message, the second processing unit to execute the operations that access the shared memory.

10. The storage device of claim 9, wherein the instructions that enable the second processing unit to execute the operations further include instructions that configure the processing circuitry to:
gate the delivery of the message by flushing the cache.

11. The storage device of claim 9, wherein the instructions that enable the second processing unit to execute the operations that access the shared memory include instructions that configure the second processing unit to:
access the updated data from the shared memory;
store the updated data in a cache associated with the second processing unit;
modify the updated data in the cache; and
flush the cache to store further updated data in the shared memory.

12. The storage device of claim 9, further comprising instructions that configure the processing circuitry to:
transfer ownership of at least a portion of the shared memory to the second processing unit through the delivery of the message to the second processing unit.

13. The storage device of claim 9, wherein the instructions that deliver a message to the second processing unit further include instructions that configure the processing circuitry to:
delay delivery of the message to the second processing unit while the first processing unit flushes the cache associated with the first processing unit.

14. The storage device of claim 9, wherein the message is a work unit message, and wherein the computer-readable storage medium further comprises instructions that configure the processing circuitry to:
identify the work unit message; and
determine that the work unit message designates the second processing unit to execute the operations that access the shared memory.

15. The storage device of claim 9, wherein the instructions that enable the second processing unit to execute the operations further include instructions that configure the processing circuitry to:
release the message to the second processing unit.

16. The storage device claim 9, wherein the instructions that modify the data in the shared memory further include instructions that configure the first processing unit to:
process data included within a network packet.

17. A computing system comprising shared memory and a memory management system, wherein the memory management system is configured to:
enable a first processing unit to modify data in the shared memory;
receive an indication that modifying data in the shared memory is complete;
after receiving the indication that modifying the shared memory is complete, deliver a message to a second processing unit, wherein the message specifies operations that access the shared memory;
transfer ownership of at least a portion of the shared memory to the second processing unit through the delivery of the message to the second processing unit; and enable, after delivering the message, the second processing unit to execute the operations that access the shared memory.

18. The computing system of claim 17, wherein the memory management system is further configured to store the data in a cache associated with the first processing unit.

19. The computing system of claim 18, wherein the memory management system is further configured to modify the data in the cache to yield updated data.

20. The computing system of claim 19, wherein the memory management system is further configured to flush the cache to store the updated data in the shared memory.

\* \* \* \* \*